Jan. 21, 1947. L. A. MAJNERI 2,414,753
HYDRAULIC BRAKE CONSTRUCTION
Filed June 21, 1945 4 Sheets-Sheet 1
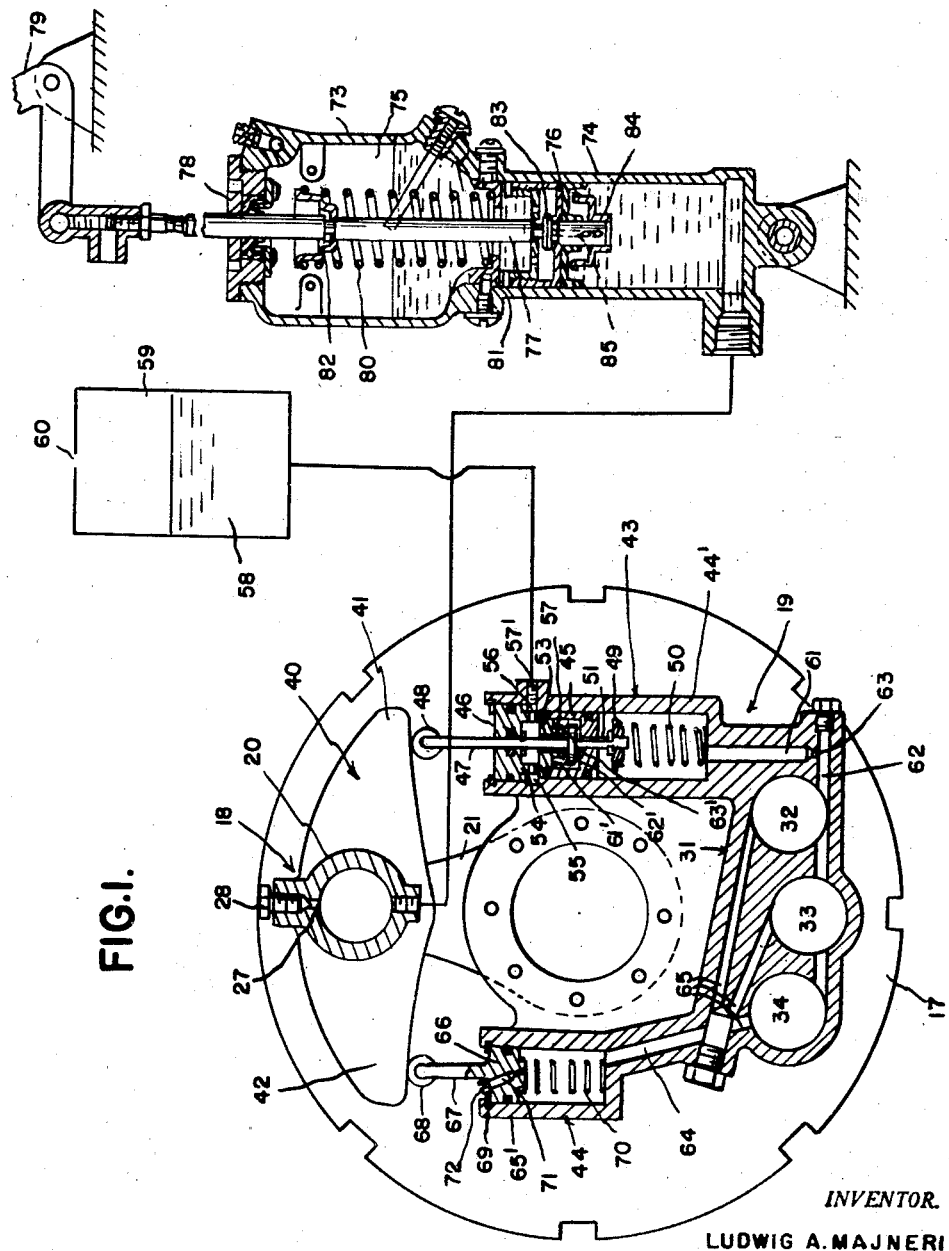
INVENTOR.
LUDWIG A. MAJNERI
BY
Whittemore Hulbert & Belknap
ATTORNEYS

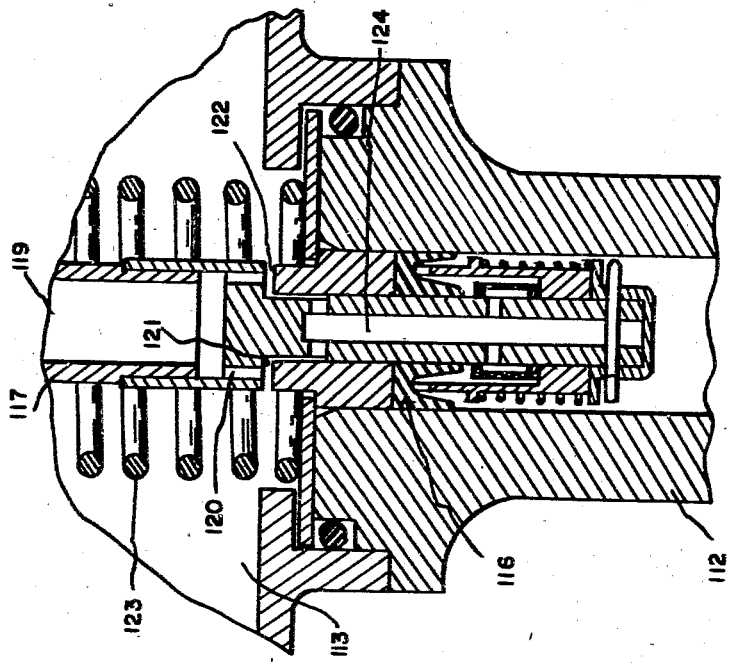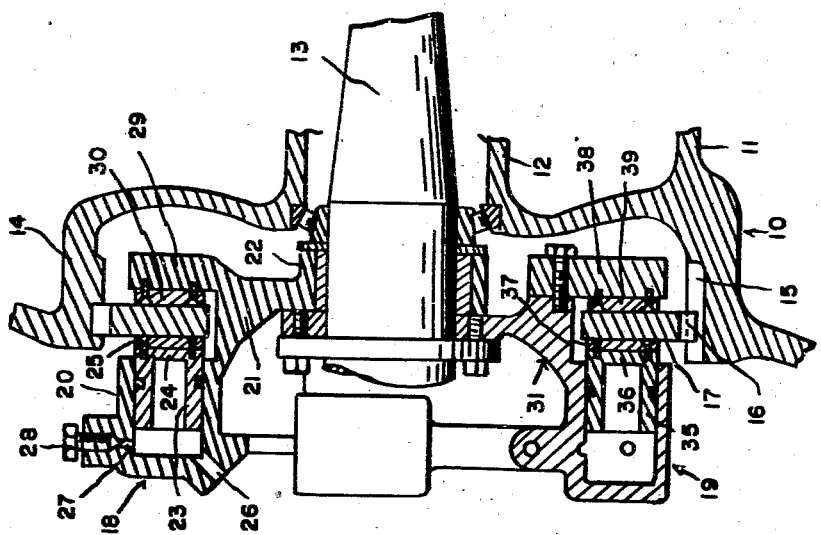

Jan. 21, 1947. L. A. MAJNERI 2,414,753
HYDRAULIC BRAKE CONSTRUCTION
Filed June 21, 1945 4 Sheets-Sheet 3

INVENTOR.
LUDWIG A. MAJNERI
BY
Whittemore Hulbert & Belknap
ATTORNEYS

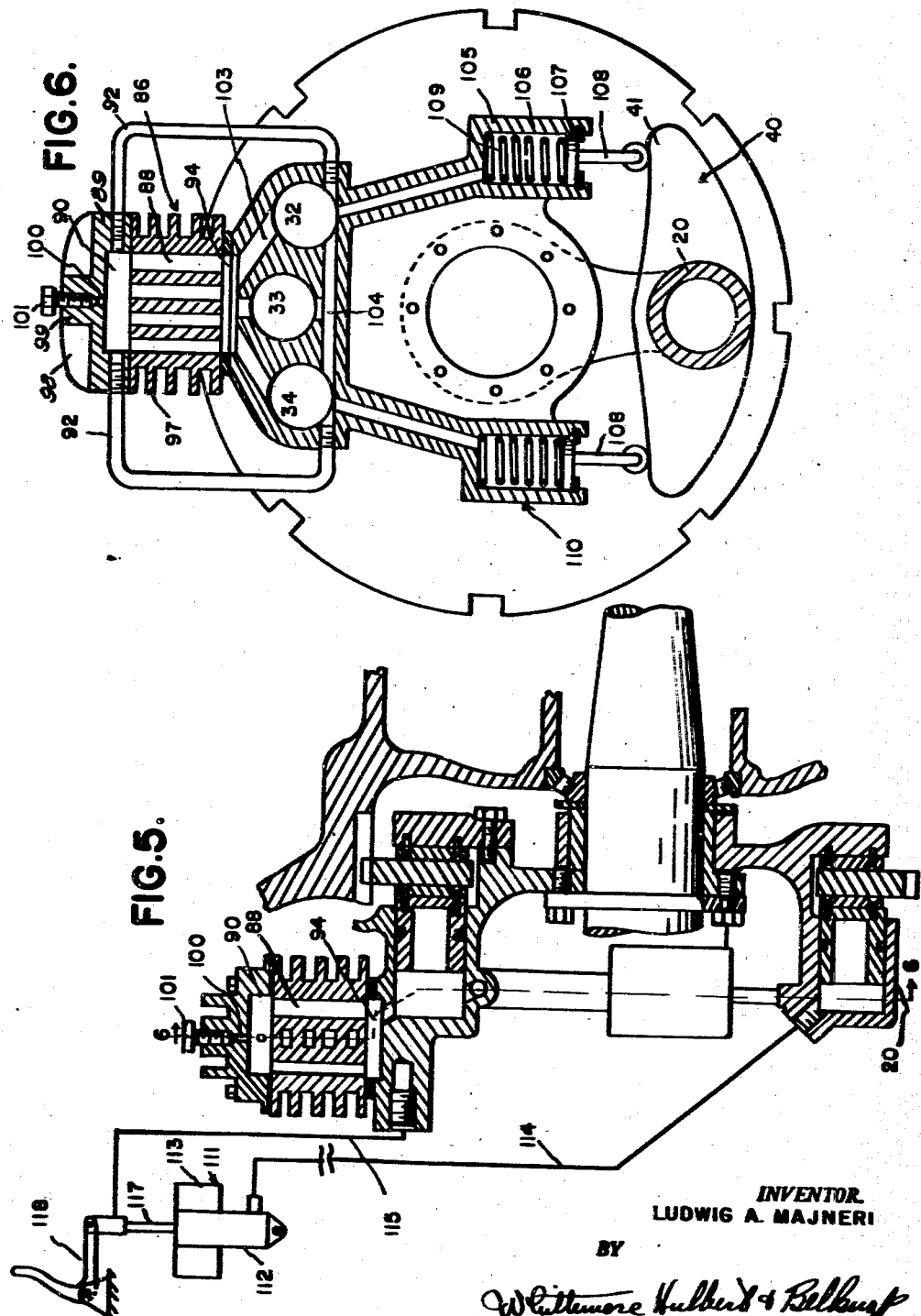

Patented Jan. 21, 1947

2,414,753

UNITED STATES PATENT OFFICE 2,414,753

HYDRAULIC BRAKE CONSTRUCTION

Ludwig A. Majneri, Grosse Pointe, Mich., assignor to The Warner Aircraft Corporation, Detroit, Mich., a corporation of Michigan Application June 21, 1945, Serial No. 600,808

16 Claims. (Cl. 188—152)

This invention relates generally to hydraulic brakes and refers more particularly to hydraulic disc type vehicle ground engaging wheel brakes.

While the invention is applicable to various different designs of disc type hydraulic brakes, nevertheless, it finds particular utility when used in connection with aircraft landing wheel disc brakes of the type having an energizing or booster hydraulic system embodying a wheel cylinder and having a main brake applying hydraulic system including one or more wheel cylinders. In hydraulic brakes of the above design, the energizing wheel cylinder is supported for rocking movement in opposite directions about the axis of rotation of the wheel and hydraulic fluid medium is displaced in the energizing wheel cylinder to initially apply the friction brake by a manually operable control unit including a master cylinder. Initial application of the brake by the energizing wheel cylinder shifts the latter in one or the other direction about the wheel axis depending upon the direction of rotation of the wheel. Regardless of the direction of rotation of the wheel, the resulting shifting movement of the energizing wheel cylinder serves to displace hydraulic fluid medium in the main brake applying system to fully apply the brake. Generally speaking, the total torque created by the brake is the combined torque of the energizing wheel cylinder and the wheel cylinder or cylinders embodied in the main brake applying system.

Due to the fact that the wheel cylinders are located in such close proximity to the brake friction means, much of the heat generated by the latter during brake application is absorbed by the hydraulic fluid medium. The amount of heat absorbed by the fluid is, generally speaking, proportional to the duration and the severity of the brake application. Heating of the brake fluid while the latter is under the brake applying pressure does not ordinarily interfere with the braking operation, because the air is retained in the fluid and boiling of the fluid is prevented. However, following the release of the brake, the brake fluid is returned to atmospheric pressure and, if the temperature of the fluid is high, air is liberated from the fluid and the fluid is vaporized to some extent. These vapors become trapped in the energizing and main brake applying systems. This condition may reach a critical point where reapplication of the brake by the master cylinder merely compresses the vapor in one or both systems without displacing fluid in the wheel cylinders.

Inasmuch as the energizing wheel cylinder is connected directly to the master cylinder, the above condition may be overcome in the energizing system by providing a master cylinder having provision for introducing additional fluid into the system from a reservoir in response to "pumping" the system by rapidly releasing and reapplying the master cylinder. However, the main brake system in disc brakes of the above general type form a separate circuit, and no provision is made to insure operation of the main brake applying wheel cylinders during or following severe brake application.

With the above in view, this invention contemplates a disc brake assembly of the general type briefly described, wherein operation of both systems to apply the brake is assured even though a vapor condition exists in either or both systems. More specifically, the invention has as one of its objects the provision of a booster type brake assembly so constructed and arranged that "pumping" of the master cylinder serves to introduce hydraulic fluid medium to both the energizing brake applying system and the main brake applying system.

Another object of this invention is to provide a booster type brake having provision for conducting vapors from the main brake applying wheel cylinder or cylinders to the actuating cylinder provided for displacing fluid in the main brake applying wheel cylinder or cylinders in response to the shifting motion of the energizing wheel cylinder resulting from applying the brake during reverse rotation of the vehicle wheel. The presence of vapors in the so-called "reverse" actuator is not critical, especially where the brake is installed on aircraft, because it is rarely necessary to arrest rearward motion of such vehicles. The principal advantage of the above arrangement is that it excludes the vapors from the other brake actuator which, in the interests of brevity, is referred to herein as the forward actuator.

Still another object of this invention is to provide a forward actuator characterized in that the cylinder thereof is connected at the top to a reserve supply of hydraulic fluid medium and in that the piston in the cylinder is provided with a valve controlled passage therethrough. This passage is open in the released position of the actuator to enable fluid from the reservoir to pass therethrough into the portion of the cylinder below the piston and is automatically closed upon movement of the piston to displace fluid in the main brake applying wheel cylinders. Thus, if a condition exists in the main brake applying system where displacement of the forward actuator piston merely compresses the vapor without actually displacing sufficient braking fluid to apply the brake, additional fluid may be supplied by merely pumping the master cylinder. This pumping operation acts through the energizer wheel cylinder to effect rapid reciprocation of the forward actuator piston until sufficient fluid displacement is obtained to apply the brake.

A further object of this invention is to provide a condenser through which the vapors are circulated and condensed. This feature, as well as the foregoing and other objects, will be made more apparent as this description proceeds, especially when considered in connection with the accompanying drawings, wherein:

Figure 1 is a schematic view partly in section of a hydraulic brake system embodying a brake constructed in accordance with this invention;

Figure 2 is a longitudinal sectional view through the brake construction and showing the same applied to a vehicle ground engaging wheel;

Figure 5 is a schematic view of another hydraulic braking system showing a modified form of brake in section;

Figure 6 is a sectional view taken on the plane indicated by the line 6—6 of Figure 5; and Figure 7 is an enlarged sectional view of a part of the master cylinder shown in Figure 3.

Figure 2A:
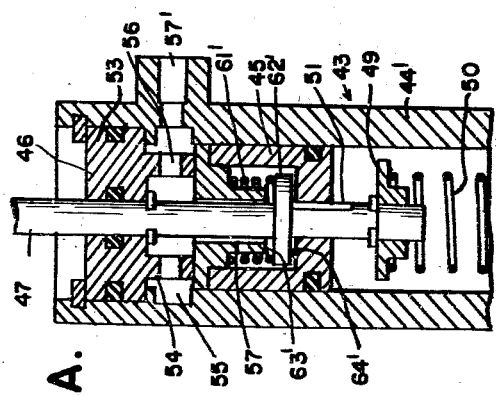
Figure 2A is an enlarged fragmentary sectional view through one of the hydraulic actuators.

Hydraulic brakes embodying the features of this invention may be employed in connection with various different types of vehicles, but are particularly adapted for installation in connection with the ground engaging wheels for aircraft. With this in view, reference is made to the embodiment of the invention shown in Figures 1 and 2, wherein the reference character 10 indicates a typical aircraft ground engaging wheel having a tire supporting rim portion 11 and having a hub 12 journalled on an axle 13. In addition, the wheel 10 is provided with an axially rearwardly extending annular portion 14 concentrically disposed with respect to the axis of rotation of the wheel and having a plurality of circumferentially spaced axially extending ribs 15 on the inner surface thereof for engagement in correspondingly shaped grooves 16 formed in the periphery of a disk or ring 17. With the above construction the disk 17 rotates as a unit with the wheel 10 and at the same time is capable of sliding movement axially of the wheel 10.

The disk 17 forms a part of the hydraulic brake assembly, which comprises an energizing or booster system 18 and a main brake applying system 19. The energizing system 18 includes a wheel cylinder 20 formed in a bracket 21 having a hub portion 22 journalled on the axle 13 for rocking movement in opposite directions about the axis of rotation of the wheel 10. The wheel cylinder 20 is positioned at the rear side of the disk 17 and includes a piston 23 having a head portion 24 which projects through the front end of the cylinder 20. A disk 25 of friction material is riveted or otherwise secured to the front side of the head 24 on the piston and is adapted to engage the adjacent side of the disk 17 upon movement of the piston in a forward direction by a hydraulic fluid medium under pressure supplied through a port 26 formed in the bottom of the cylinder 20 adjacent the rear wall of the latter. The top wall of the cylinder 20 is formed with a bleed passage 27 and the latter is normally closed by a plug 28.

The bracket 21 is also formed with a radially outwardly extending projection 29 positioned at the front side of the disk 17 and having a disk 30 of friction material riveted or otherwise secured to the rear face thereof. The friction disk 30 is positioned directly opposite the friction disk 25 on the piston 23, so that forward movement of the piston 23 in the cylinder 20 imparts a corresponding movement to the disk 17 and frictionally engages the latter with the disk 30 on the projection 29 of the bracket 21.

The main brake applying system includes a bracket 31 having a portion at the rear side of the disk 17 fashioned to form one or more wheel cylinders. While the number of wheel cylinders may vary in accordance with design specifications, nevertheless, for the purpose of illustrating this invention, the bracket 31 is shown as formed with three wheel cylinders indicated in Figure 1 of the drawings by the reference characters 32, 33 and 34. Each wheel cylinder includes a piston 35 having a head portion 36 which projects through the front end portions of the cylinders and is provided with a friction disk 37 for engagement with the rear side of the disk 17. The bracket 31 is suitably secured to the axle 13 and is provided with a radially outwardly extending projection 38 positioned at the front side of the disk 17. Suitable friction material 39 is riveted or otherwise secured to the rear face of the projection 38 directly opposite the friction disks 37 for engagement with the disk 17 upon movement of the pistons 35 in a forward direction.

The wheel cylinders of both systems are filled with a hydraulic fluid medium and displacement of the fluid in the wheel cylinders of the system 19 is responsive to displacement of the wheel cylinder 20 in the system 18. Upon reference to Figure 1 of the drawings, it will be noted that the operative connection between the energizing system 18 and the main brake applying system 19 includes a cam 40 formed integral with the wheel cylinder 20. In detail, the cam 40 comprises projections 41 and 42, which respectively extend laterally outwardly from opposite sides of the wheel cylinder 20 adjacent the rear end of the latter.

The projection 41 extends in operative relationship to a hydraulic actuator 43 positioned at one side of the axle and the projection 42 extends in operative relation to a second hydraulic actuator 44 positioned at the opposite side of the axle 13. The actuator 43 will be hereinafter referred to as the forward actuator and the actuator 44 will be referred to as the rear actuator.

The forward actuator 43 comprises a cylinder 44' and a piston 45 slidably mounted in the cylinder. The upper end of the cylinder 44 is closed by a cap 46 having an opening through the center thereof for slidably receiving a rod 47 having a follower in the form of a roller 48 at the upper end engageable with the projection 41 on the cam 40. The lower end of the rod 47 projects through an opening formed in the head of the piston and has an abutment 49 secured thereto. The abutment 49 is engaged by the upper end of a coil spring 50 having the lower end seated on the bottom of the cylinder 44'. The portion of the rod 47 which projects through the head of the piston is formed with an elongated slot providing a passage 51 through the piston and this passage is adapted to be closed by an enlargement 62' formed on the rod at the top side of the piston head.

The spring 50 acts on the abutment 49 to normally maintain the rod in its uppermost position shown in Figure 1 of the drawings, wherein the roller 48 engages the projection 41 on the cam 40. In this connection, attention is called to the fact that rotation of the cam 40 or bracket 21 about the wheel axis by the spring 50 is prevented by the retracting spring in the rear actuator which is stronger than the spring 50. A cap 53 is threaded up the upper end of the piston and is adapted to abut the lower end of an annular flange 54 depending from the cap 46. The flange 54 coacts with the adjacent wall of the cylinder to provide an annular chamber 55 and is provided with circumferentially spaced ports 56 which connect the chamber 55 to the cylinder above the piston. The cap has a vertical bore 57 therethrough of sufficient diameter to receive the rod 47 and to provide a passage for connecting the passage 51 to the portion of the cylinder above the piston or, in other words, to the chamber 55 through the ports 56. The chamber 55 is formed with a port 57' which is connected to a reservoir 58 for hydraulic fluid medium having an expansion space 59 and a vent 60 to the atmosphere.

The piston 45 is normally urged to its uppermost position in the cylinder by a spring 61' having the upper end abutting the cap 53 and having the lower end seated on a valve member 62' in the form of a cylindrical enlargement on the rod 47. As shown in Figure 1 of the drawings, the enlargement or valve member 62' occupies a position between a valve seat 63' surrounding the lower end of the passage 57 and a valve seat 64' surrounding the upper end of the passage 51.

The above arrangement is such that when the actuator 43 is in its released position shown in Figure 1 of the drawings, the valve member 62' is in an intermediate position wherein both passages are open and communication is established between the reservoir 58 and the portion of the cylinder 44' below the piston 45.

The lower end of the cylinder 44' communicates with a passage 61 formed in the bracket 31 and connected to a passage 62 through the medium of a restricted port 63. The passage 62 is connected to the wheel cylinders 32 to 34 inclusive through the bottom walls of the latter. The top portions of the wheel cylinders 32 to 34 inclusive are respectively connected to a passage 64 by the passages 65. The passage 64 communicates with the lower end of the cylinder 65' for the rear actuator 44. A piston 66 is slidably mounted in the cylinder 65' and is provided with an upwardly extending rod 67 having a roller 68 for contact with the projection 42 on the cam 40. Upward movement of the piston 66 is limited by a spring washer 69 secured in the cylinder adjacent the upper end thereof and the piston is normally urged into engagement with the washer by a spring 70 which, as stated above, is stronger than the spring 50. A bleed passage 71 is formed through the piston 66 and is normally closed by a plug 72.

During filling of the main brake applying system 19 with hydraulic fluid medium, the various parts are in the relative positions thereof shown in Figure 1 of the drawings, with the exception that the plug 72 is removed. Hydraulic fluid medium is caused to flow through the system until the fluid discharges through the bleed port 71. When it is evident that all of the air is excluded from the system, the port 71 is again closed by the plug 72.

The energizing brake applying system 18 includes a master cylinder 73, which will be more fully hereinafter described and this system is filled until fluid escapes through the bleed passage 27 in the wheel cylinder 20. When it is evident that all air is excluded from the energizing system, the bleed port 27 is again closed by the plug 28.

The master cylinder 73 selected for the purpose of illustrating this invention comprises a cylinder 74, a reservoir 75 above the cylinder and a piston 76 slidably mounted in the cylinder. The piston 76 is operated by a rod 77 which projects upwardly through a cap 78 at the upper end of the reservoir and is connected to a manually operable control 79. The piston 76 is normally urged to its uppermost position by means of a spring 80 surrounding the rod 77. The lower end of the spring engages a fixed abutment 81 at the upper end of the cylinder and the upper end of the spring engages an abutment 82 secured to the rod. The piston 76 is actually slidably supported on the lower end of the rod between the abutments 83 and 84 respectively fixed to the rod at opposite sides of the head portion of the piston. The lower end of the rod is formed with a passage 85, which is adapted to establish communication between the portion of the cylinder 74 below the piston 76 and the reservoir 75. This passage is normally held open by the spring 80 and is closed by the abutment 83 upon downward movement of the rod to actuate the piston.

*Operation*

Assuming that the wheel 10 is rotating in a forward direction and that it is desired to apply the brake, the operator merely manipulates the control 79 to move the piston 76 in the master cylinder 73 downwardly. The lower end of the cylinder 74 communicates with the port 26 in the wheel cylinder 20 so that hydraulic fluid medium is displaced in the cylinder 20. Displacement of hydraulic fluid medium in the wheel cylinder 20 forces the piston 23 into engagement with the disk 17 and moves the disk axially of the wheel 10 into engagement with the friction means 30. The resulting friction swings the bracket 21 about the axis of rotation of the wheel in a direction to engage the projection 41 on the cam 40 with the rod 47 of the actuator 43. The rod 47 is moved downwardly by the cam 40 and engages the valve member 62' with the seat 64' to close the passage 51 through the piston 45. Continued downward movement of the rod imparts a corresponding movement to the piston 45 and displaces hydraulic fluid medium in each of the three wheel cylinders 32 to 34 inclusive. As a result, the pistons 35 in these wheel cylinders are moved forwardly to complete application of the brake.

Application of the brake during rotation of the wheel 10 in the reverse direction is accomplished in the same manner by manipulating the master cylinder to displace hydraulic fluid medium in the wheel cylinder 20. In this instance, however, the resulting friction swings the wheel cylinder 20 in the opposite direction to engage the projection 42 on the cam 40 with the piston rod 67. As a result, the piston 66 is moved downwardly to displace hydraulic fluid medium in each of the three cylinders 32 to 34 inclusive to complete application of the brake in the reverse direction. In this connection, it will be noted that as the piston 66 is moved downwardly to displace fluid in the main brake applying wheel cylinder, fluid is also displaced in the actuator cylinder 44' and the valve member 62' is moved upwardly into engagement with the seat 63' to close the passage 57. As a result, fluid medium is prevented from escaping to the reservoir during reverse braking.

Due to the fact that the wheel cylinders of both systems are located in such close proximity to the brake friction means, it is possible for the heat generated by the brake friction means to raise the temperature of the hydraulic fluid medium to a value where vapors occur in both systems. This condition is not particularly serious during the period the systems are under brake applying pressure, because while this pressure is maintained, air and vapors cannot readily separate from the hydraulic fluid medium. However, as soon as the braking pressure is relieved and the heated fluid medium is again returned to atmospheric pressure, air is liberated from the hydraulic fluid medium and the latter commences to vaporize. As a result, the braking fluid in the energizing system is forced through the passage 85 in the master cylinder 73 into the reservoir 75 and the fluid level in the reservoir rises into the expansion space provided for this purpose. On the other hand, vapors trapped in the main brake applying wheel cylinders 32 to 34 inclusive pass upwardly through the passage 65 and 64 to the cylinder 65' of the rear brake actuator 44. Any escape of such vapors into the actuator 43 is resisted by the restricted port 63 and also by the head of hydraulic fluid medium existing between the reservoir 58 and the main brake applying wheel cylinders. However, hydraulic fluid medium in the cylinder 44' of the forward brake actuator may escape through the passage 51 into the reservoir 58.

Assuming now that it is necessary to apply the brake while the vapor condition still exists in the systems, it will be noted that the operator manipulates the master cylinder 73 in the usual manner to displace hydraulic fluid medium in the energizing wheel cylinder 20. However, if the vapor condition existing in the brake is severe, it is possible that the displacement of the master cylinder will not be sufficient to compress the vapors to the extent required to apply the brake. In other words, the condition may exist where the master cylinder reaches the end of its stroke without actually applying the brake energizing system. As soon as this is evident, the operator, in effect, "pumps" the master cylinder or, in other words, rapidly releases and applies the same. As a result of this action, hydraulic fluid medium escapes from the reservoir 75 through the passage 85 to the energizing system on each return stroke of the master cylinder. This additional supply of fluid in the energizing system is sufficient to compress the existing vapors and provide normal application of the brake by the energizing system.

Normal operation of the energizing or booster system 18 to initially apply the brake does not necessarily mean that the main brake applying system will function to complete application of the brake, because the vapor condition in the latter system may be so severe that downward movement of the piston 45 in the cylinder 44 merely compresses the vapors and does not displace sufficient fluid in the main brake applying wheel cylinders to affect operation of the brake. If this condition exists, the operator merely rapidly releases and operates the master cylinder 73 to effect a corresponding operation of the forward actuator 43 through the cam 40 and energizing wheel cylinder 20. On each return stroke of the piston 45 in the actuator cylinder 44', hydraulic fluid medium is admitted to the actuator cylinder from the reservoir 58 through the passage 51 in the piston 45 and eventually, sufficient fluid is supplied to the actuator 43 to provide the displacement in the wheel cylinders required to enable application of the brake. Thus, it is possible to effect operation of the brake, regardless of the vapor condition existing in either or both the systems 18 and 19.

Figure 3:
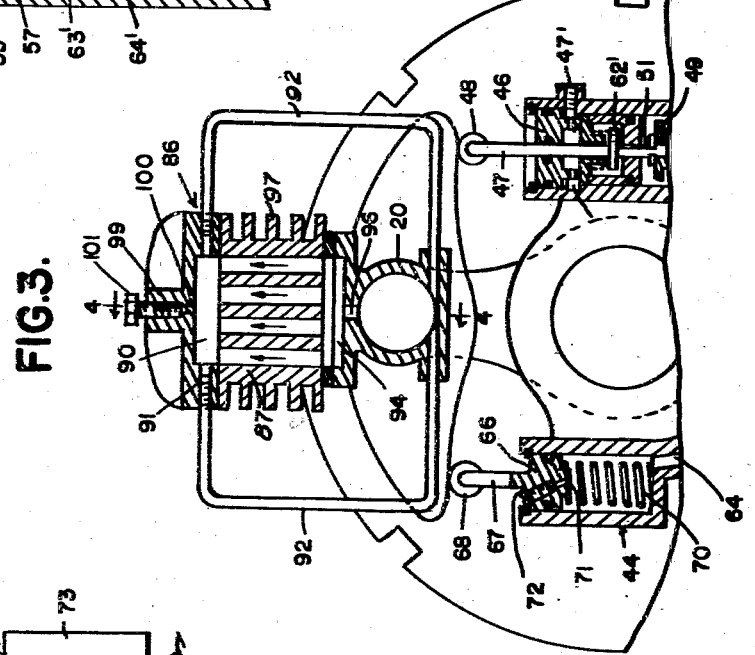
Figure 3 is a fragmentary sectional view of a slightly modified brake construction.
Figure 4:
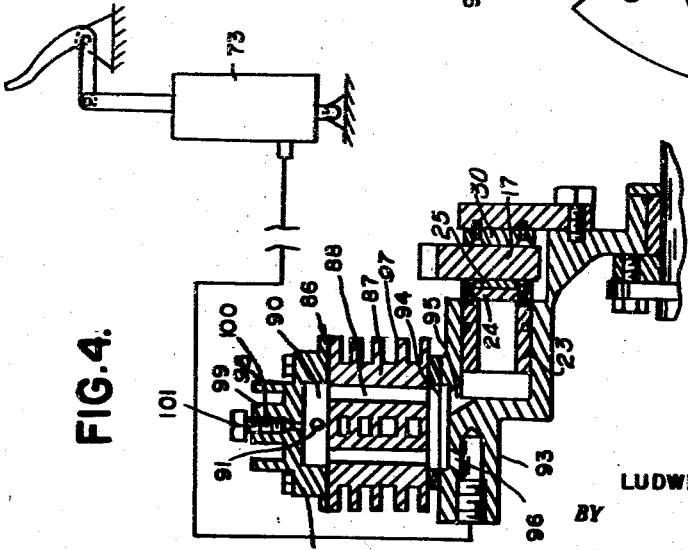
Figure 4 is a sectional view taken on the line 4—4 of Figure 3.

It follows from the foregoing that when a severe vapor condition exists in both systems, it is necessary to effect two distinct "pumping" operations of the master cylinder 73 in order to first render the energizing system operative and to subsequently render the main brake applying system operative. In order to overcome the necessity of first "pumping-up" the energizing system 18, and thereby reduce the time required to operate the brake when the latter possesses a critical vapor condition, the embodiment of the invention shown in Figures 3 and 4 may be provided. In this embodiment of the invention, the vapors generated in the energizing wheel cylinder 20 are condensed by circulating the same through a suitable condenser 86. In detail, the condenser 86 comprises a body portion 87 suitably secured to the top of the wheel cylinder 20 and having a plurality of vertical passages 88 therethrough. The upper ends of the passages 88 are closed by a cap having a chamber 90 communicating with the upper ends of the passages 88 and having diametrically opposed ports 91 in opposite side walls. The ports 91 are connected to the wheel cylinder 20 at the bottom of the latter by means of conduits 92.

The wheel cylinder 20 is modified to some extent from the illustration thereof shown in Figure 2 of the drawings. In this connection, it will be noted that the port 26 is eliminated and an extension 93 is formed on the cylinder adjacent the top of the latter. The extension 93 forms a support for the condenser 86 and cooperates with the lower end of the condenser body 87 to form a chamber 94, which communicates with the lower ends of the vertical passages 88. The chamber 94 also communicates with the cylinder 20 at the rear end of the piston 23 through a port 95 and further communicates with a passage 96 in the extension 93. The passage 96, in turn, communicates with the master cylinder 73 with the result that hydraulic fluid medium from the master cylinder is required to flow upwardly through the chamber 94 to the cylinder 20. In other words, the cylinder 20 is not directly connected to the master cylinder and this is desirable in the present instance, because it tends to influence any vapors in the cylinder 20 to pass upwardly into the condenser 86.

It will further be noted that the condenser is supported in the air stream and is provided with a plurality of heat dissipating ribs 97 on the body portion 87. The cap 89 is also formed with heat dissipating ribs 98 and, in addition, is provided with a boss 99, having a bleed port 100 normally closed by a plug 101.

It follows from the foregoing that any incipient vapors generated in the energizing wheel cylinder 20 pass through the port 95 to the chamber 94 at the lower end of the condenser 86 and flow upwardly through the vertical passages 88 to the chamber 90 at the top of the condenser. The vapors rising in the condenser displace the hydraulic fluid medium through the conduits 92 to the energizing wheel cylinder 20 and maintains the latter filled with hydraulic fluid medium. As the incipient vapors pass upwardly through the vertical passages 88, these vapors are cooled and are condensed so that practically no vapor is returned to the energizing wheel cylinder 20. It is also pointed out that due to the tendency for the air blast to cool the front part of the condenser to a greater extent than the rear portions of the latter, a secondary circulation takes place through the condenser as indicated by the arrow in Figure 3 of the drawings. Thus, practically no vapors are allowed to remain in the energizing wheel cylinder 20 and the capacity of the latter is sufficient at all times to insure proper operation of the energizing brake applying system. This feature is of importance since it eliminates the necessity of "pumping-up" the energizing system when a critical vapor condition exists in the brake and the time required to apply the brake is thereby reduced.

In the embodiment of the invention shown in Figures 5 and 6, the energizing wheel cylinder 20 is supported at the bottom and the main brake applying wheel cylinders 32 to 34 inclusive are located at the top. This arrangement of the wheel cylinders enables employing a condenser in association with the main brake applying wheel cylinders to condense vapors formed in the latter. The condenser employed may be identical to the one illustrated in Figures 3 and 4 of the drawings, and accordingly, the same reference characters are applied to this condenser. As shown in Figure 6 of the drawings, the chamber 94 at the bottom of the condenser 86 is connected to each of the three wheel cylinders by a passage 103. The chamber 90 at the top of the condenser is respectively connected to the end wheel cylinders 32 and 34 by the conduits 92 and the intermediate wheel cylinder 33 is connected to the end wheel cylinders by a passage 104. It will be noted that the passage 103 is connected into the top portions of the wheel cylinders in order to enable vapors to readily pass from the wheel cylinders to the condenser and the chamber 90 at the top of the condenser is connected to the lower portions of the wheel cylinders to return hydraulic fluid medium thereto without interference with the vapors.

Due to the fact that the condenser automatically condenses any incipient vapors generated in the main brake applying wheel cylinders, the forward actuator 105 may be greatly simplified. As shown in Figure 6 of the drawings, the forward actuator comprises a cylinder 106 and a piston 107 reciprocably mounted in the cylinder. The piston is provided with a rod 108, which engages the projection 41 on the cam 40 and is normally urged in a direction toward the cam by a coil spring 109. The rear actuator 110 may be identical to the front actuator, and accordingly, need not be described in detail. Both actuators are operated by the energizing wheel cylinder 20 in the same manner described in detail in connection with the first embodiment of this invention.

Although the condenser associated with the main brake applying wheel cylinders, in effect, automatically compensates for vapors in these wheel cylinders, nevertheless, it is important to connect the wheel cylinders to a reservoir of hydraulic fluid medium so that the proper amount of fluid may be maintained in these cylinders at all times. This may be accomplished by providing a control unit 111 similar to the one set forth in my copending application Serial No. 594,942 filed May 21, 1945. Briefly, this control unit comprises a master cylinder 112 and a reservoir 113 positioned at the top of the master cylinder. The lower end of the master cylinder is connected to the energizing wheel cylinder 20 by means of a conduit 114 and the reservoir 113 is connected to the chamber 94 at the bottom of the condenser by means of a conduit 115.

A piston assembly 116 is slidably mounted in the master cylinder and is actuated by a rod 117, which extends through the reservoir 113 and is connected at its upper end to a manually operable control 118. The upper portion of the rod 117 is tubular in cross-section to provide a passage 119 and the upper end of the passage is connected to the conduit 115. The lower end of the passage communicates with the interior of the reservoir by means of vertical passages 120 formed through an annular shoulder 121 on the rod. The annular shoulder 121 is adapted to abut an annular shoulder 122 at the upper end of the piston assembly 116 to move the latter downwardly in the master cylinder. The arrangement is such that when the two shoulders are in contact, the passages 120 are closed so that communication between the reservoir and the main brake applying wheel cylinders is also closed.

The annular shoulders, however, are normally maintained in a separated position by means of a spring 123 so that when the master cylinder is in its inoperative position, communication is established between the reservoir and the main brake applying wheel cylinders. In this position of the master cylinder, communication is also established between the reservoir and the energizing wheel cylinder 20 through a passage 124 formed in the lower end portion of the rod 117. Thus, hydraulic fluid medium may be supplied to both the energizing and main brake applying wheel cylinders when the master cylinder is in its inoperative position. This type of control unit also assures proper operation of the energizing wheel cylinder under conditions where vapor accumulation in the latter wheel cylinder reaches a critical value, because it permits the "pumping-up" action previously described in connection with the master cylinder 73.

What I claim as my invention is:

1. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, means responsive to rocking movement of the booster wheel cylinder in one direction to displace fluid in the main brake applying wheel cylinder, and means responsive to successive movements of the booster cylinder in said one direction to introduce a supply of hydraulic fluid medium into the main brake applying system.

2. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, means responsive to rocking movement of the booster wheel cylinder to displace fluid in the main wheel cylinder, and means associated with one system for condensing any vapors formed in the wheel cylinder of the latter system.

3. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, means responsive to rocking movement of the booster wheel cylinder to displace fluid in the main wheel cylinder, means for condensing any vapors formed in one of the wheel cylinders including a condenser having passages communicating at one end thereof with the upper portion of the said one wheel cylinder and having the opposite ends communicating with the latter wheel cylinder adjacent the bottom thereof.

4. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, means responsive to rocking movement of the booster wheel cylinder to displace fluid in the main wheel cylinder, means for condensing any vapors formed in one of the wheel cylinders including a condenser supported on the top of the said one wheel cylinder in the air stream and having vertical passages respectively communicating at opposite ends with chambers at the top and bottom of the condenser, a fluid connection between the top chamber and the said one wheel cylinder adjacent the bottom of the latter, and a port connecting the bottom chamber with the said one wheel cylinder adjacent the top of the latter.

5. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, means responsive to rocking movement of the booster wheel cylinder to displace fluid in the main wheel cylinder, means for condensing any vapors formed in the booster wheel cylinder including a condenser supported on the booster wheel cylinder in the air stream and having passages communicating at opposite ends with chambers respectively positioned at opposite ends of the condenser, a fluid connection between one chamber and the booster wheel cylinder, and fluid passages connecting the other chamber to the booster wheel cylinder and to a manually operable pressure producing device.

6. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, a chamber for collecting vapors formed in the main brake applying system, means responsive to rocking movement of the booster wheel cylinder in one direction to displace fluid in the main brake applying wheel cylinder and operable to replenish the main brake applying system with hydraulic fluid medium upon successive movements of the booster cylinder in said one direction.

7. A hydraulic brake for a vehicle ground engaging wheel comprising a booster system adapted to be filled with hydraulic medium and including a wheel cylinder positioned at the top of the brake, means supporting the booster wheel cylinder for rocking movement about the axis of rotation of the wheel, a main brake applying system also adapted to be filled with a hydraulic fluid medium and including a wheel cylinder positioned at the bottom of the brake, means responsive to rocking movement of the booster cylinder to displace fluid in the main brake applying wheel cylinder, a condenser supported on the top of the booster wheel cylinder in the air stream and having vertically spaced chambers connected together by vertical passages, a fluid connection between the top chamber and the booster wheel cylinder adjacent the bottom of the latter, and fluid passages connecting the bottom chamber to the booster wheel cylinder adjacent the top of the latter and to a manually operable pressure producing device.

8. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, means responsive to rocking movement of the booster wheel cylinder to displace fluid in the main wheel cylinder, means for condensing any vapors formed in one of the wheel cylinders including a condenser supported on the top of said one wheel cylinder in the air stream and having vertical passages respectively communicating at opposite ends with chambers at the top and bottom of the condenser, a fluid connection between the top chamber and the said one wheel cylinder adjacent the bottom of the latter, a fluid connection between the bottom chamber and said one cylinder adjacent the top of the latter, a vent for establishing communication between the top chamber and atmosphere, and means normally closing said vent.

9. A hydraulic brake for a vehicle ground engaging wheel comprising a booster system adapted to be filled with hydraulic fluid medium and including a wheel cylinder positioned at the bottom of the brake, means supporting the booster wheel cylinder for rocking movement about the axis of rotation of the wheel, a main brake applying system also adapted to be filled with hydraulic fluid medium and including a plurality of wheel cylinders positioned at the top of the brake, means responsive to rocking movement of the booster cylinder to displace fluid in the main brake applying wheel cylinders, and a condenser in the main brake applying system for condensing any vapors formed in the main brake applying wheel cylinders.

10. A hydraulic brake for a vehicle ground engaging wheel comprising a booster system adapted to be filled with hydraulic fluid medium and including a wheel cylinder positioned at the bottom of the brake, means supporting the booster wheel cylinder for rocking movement about the axis of rotation of the wheel, a main brake applying system also adapted to be filled with hydraulic fluid medium and including a plurality of wheel cylinders positioned at the top of the brake, means responsive to rocking movement of the booster cylinder to displace fluid in the main brake applying wheel cylinders, a condenser supported at the top of the main brake applying wheel cylinders in the air stream and having vertically spaced chambers communicating with each other by vertical passages, a fluid connection between the top chamber and the lower portions of the main brake applying wheel cylinders, and additional fluid connections between the bottom chamber and the upper portions of each main brake applying wheel cylinder.

11. A hydraulic brake for a vehicle ground engaging wheel comprising a booster system adapted to be filled with hydraulic fluid medium and including a wheel cylinder positioned at the bottom of the brake, means supporting the booster wheel cylinder for rocking movement about the axis of rotation of the wheel, a main brake applying system also adapted to be filled with hydraulic fluid medium and including a plurality of wheel cylinders positioned at the top of the brake, means responsive to rocking movement of the booster cylinder to displace fluid in the main brake applying wheel cylinders, a condenser supported at the top of the main brake applying wheel cylinders in the air stream and having vertically spaced chambers communicating with each other by vertical passages, a fluid connection between the top chamber and the lower portions of the main brake applying wheel cylinders, means establishing communication between the bottom condenser chamber and the upper portions of the main brake applying wheel cylinder, and means for independently connecting the systems to a reservoir for hydraulic fluid medium.

12. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, a hydraulic actuator having a cylinder communicating with the main brake applying wheel cylinder and having a piston in the cylinder responsive to rocking movement of the booster wheel cylinder in one direction to displace fluid in the main brake applying wheel cylinder, spring means for normally holding the piston in its released position, a passage for establishing communication between the main brake applying wheel cylinder and a reservoir for hydraulic fluid medium, a second hydraulic actuator responsive to rocking movement of the booster cylinder in the opposite direction to displace fluid in the main brake applying wheel cylinder, and a valve responsive to initial movement of the booster cylinder in either direction to close said passage.

13. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, a hydraulic actuator having a cylinder communicating with the main brake applying wheel cylinder and having a piston in the cylinder responsive to rocking movement of the booster wheel cylinder in one direction to displace fluid in the main brake applying wheel cylinder, spring means for normally holding the piston in its released position, and means for connecting the main brake applying wheel cylinder to a fluid reservoir through the piston in the released position of the latter.

14. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, a hydraulic actuator having a cylinder communicating with the main brake applying wheel cylinder and having a piston in the cylinder responsive to rocking movement of the booster wheel cylinder in one direction to displace fluid in the main brake applying wheel cylinder, spring means for normally holding the piston in its released position, a passage through the piston for establishing communication between the main brake applying wheel cylinder and a reservoir for hydraulic fluid medium, a valve responsive to initial rocking movement of the booster cylinder in the direction aforesaid to close said passage and responsive to return movement of the piston to open the passage.

15. A hydraulic brake for a vehicle ground engaging wheel comprising a booster system adapted to be filled with a hydraulic fluid medium and including a wheel cylinder, means supporting the booster wheel cylinder for rocking movement about the axis of rotation of the wheel, a main brake applying system also adapted to be filled with a hydraulic fluid medium and including a wheel cylinder, a hydraulic actuator having a cylinder communicating with the main brake applying wheel cylinder adjacent the bottom of the latter and having a piston in the cylinder responsive to rocking movement of the booster cylinder in one direction to displace fluid in the main brake applying wheel cylinder, a second hydraulic actuator having a cylinder communicating with the main brake applying wheel cylinder adjacent the top of the latter and having a piston responsive to rocking movement of the booster cylinder in the opposite direction to displace fluid in the main brake applying wheel cylinder.

16. A hydraulic brake for a vehicle ground engaging wheel comprising a booster system adapted to be filled with hydraulic fluid medium and including a wheel cylinder positioned at the top of the brake, means supporting the booster wheel cylinder for rocking movement about the axis of rotation of the wheel, a main brake applying system also adapted to be filled with a hydraulic fluid medium and including a plurality of wheel cylinders positioned at the bottom of the brake, a hydraulic actuator having a cylinder communicating with the main brake applying wheel cylinders adjacent the bottom portions thereof and having a piston in the cylinder responsive to rocking movement of the booster wheel cylinder in a forward direction to displace fluid in the main wheel cylinders, spring means for normally holding the piston in its released position, means for connecting the main wheel cylinders to a fluid reservoir through the piston in the released position of the latter, a second hydraulic actuator having a cylinder communicating with the main wheel cylinders adjacent the top of the latter, and a piston in the actuator cylinder responsive to rocking movement of the booster cylinder in the reverse direction to displace fluid in the main brake applying wheel cylinders.

LUDWIG A. MAJNERI